Dec. 21, 1965 M. MEISSNER 3,224,042
HYDROSTATIC PRESSURE DEVICE
Filed Oct. 23, 1963
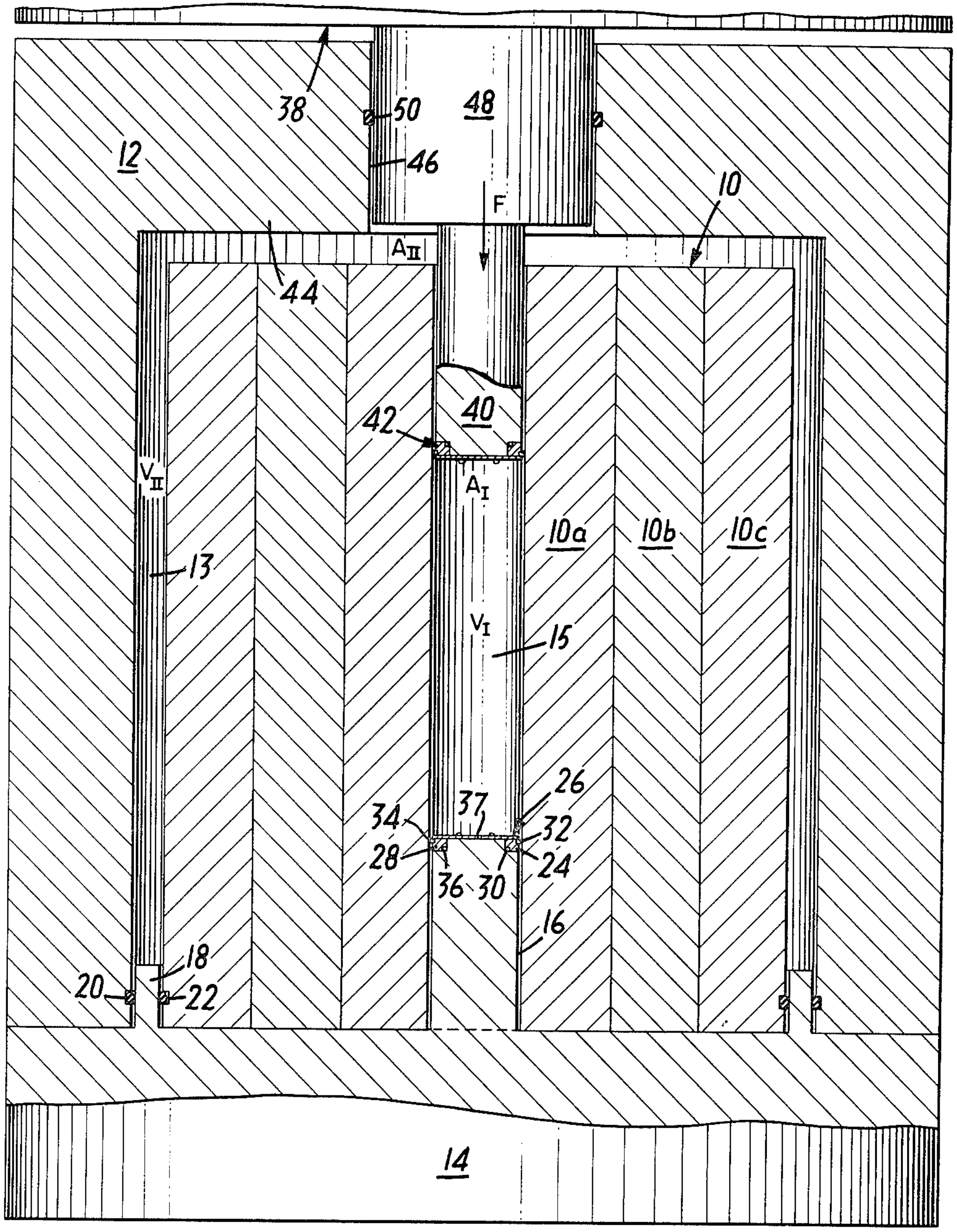
INVENTOR.
MILTON MEISSNER
BY Brumbaugh, Free, Graves & Donohue
his ATTORNEYS United States Patent Office 3,224,042
Patented Dec. 21, 1965

3,224,042
HYDROSTATIC PRESSURE DEVICE

Milton Meissner, Edgeworth, Pa., assignor to Barogenics, Inc., New York, N.Y., a corporation of New York Filed Oct. 23, 1963, Ser. No. 318,220
10 Claims. (Cl. 18—16)

This invention relates to hydrostatic pressure devices, and, more particularly, to hydrostatic pressure devices designed for very high pressures, say, in the range of 100,000 p.s.i. and above.

One problem in the design of very high pressure hydrostatic devices is to provide a vessel which is capable of sustaining the pressures without being over-stressed and is not susceptible to creep failure after a relatively short period of service.

A technique which has been used to construct high pressure vessels is to form a multi-walled cylinder in which each successive element thereof is shrink-fitted within the next adjacent outer element. In this way, a zone of pre-stress in compression is created in the inner part of the cylinder, the pre-stressing increasing the range of tensile stress which can safely be sustained over that which could be tolerated if the inner zone of the vessel were under no initial stress.

The construction of such proir art multi-wall vessels is difficult and expensive, particularly inasmuch as it requires precise machining of the bores and outer walls of each cylinder making up the vessel in order to accomplish the proper fit. A very small error in the machining of the various elements results in a very large difference in the degree of pre-stress in the inner zone of the vessel. Additionally, the walls of the vessel must be very thick in order to resist the large forces due to pressure created within the vessel. These and other disadvantages in presently known high pressure vessels make them expensive to produce, heavy and subject to malfunction due to errors in forming and assembling the vessels from several cylinders.

There is provided, in accordance with the invention, a novel and improved hydrostatic pressure device in which the tendency of a high hydrostatic pressure in a central chamber to rupture the walls thereof is reduced by a compensating hydrostatic pressure developed in one or more outer chambers surrounding the central chamber, the compensating pressure being of lower value than the central pressure so as to be more easily contained, and the pressures in both the central chamber and the one or more outer chambers being developed by the action of a single ram means.

Hydrostatic pressure is developed in a medium within the inner vessel in order to compact an object therein or for some other useful purpose. In many applications, the action to be effected by the pressurized medium can be carried out only when the pressure of the medium is of a value which would rupture a comparable conventional vessel having walls which are not compressively prestressed. In the present device, however, the tendency of the walls of the inner vessel to rupture under the outwardly acting pressure of the contained medium is reduced by the support given these walls by the inward pressure action of the hydrostatic pressure which is developed in the outer chamber. That latter pressure is, as stated, of lower value than the central pressure so as to be more easily contained than the central pressure.

To explain the stress effect of the outer compensating hydrostatic pressure on the inner vessel, if there were no central pressure in that vessel, the outer pressure would create at the inner zone of its walls a dynamic stress in compression which would strengthen those walls against rupture in a manner analogous to the strengthening provided by compressive pre-stressing. The same dynamic stressing in compression can be considered to be present when pressure is developed in the inner vessel as a component of stress which, like compressive pre-stressing, offsets the hoop tension stress set up in the walls of the inner vessel by the pressure therein. The advantage of utilizing dynamic compressive stressing rather than compressive pre-stressing to offset hoop tension is that the described problems encountered in building pre-stressing apparatus can be avoided. Of course, however, pre-stressing may, if desired, be utilized in a device according to the invention to supplement the dynamic stressing provided thereby.

The pressure differential between the higher pressure in the inner vessel and the lower pressure in the outer vessel is produced by suitable proportioning of the parameters which are determinative of the inner and outer pressures. Thus, as later described in more detail, such pressure differential is created by suitably controlling the change in volume per unit volume and/or the bulk modulus of the separate volumes of hydrostatic medium in, respectively, the inner vessel and the outer vessel.

For a better understanding of the invention, reference may be made to the following detailed description of an exemplary embodiment, taken in conjunction with the figure of the accompanying drawing, which is a view in section taken generally through the central axis of the shown device.

Referring to the drawing, the hydrostatic pressure device comprises an inner cylinder 10 and an outer cylinder 12 mounted on a base 14. Each of the cylinders 10 and 12 has a bore therein, the bore 13 of the outer cylinder 12 being coaxial with the bore 15 of the inner cylinder 10. Projecting upwardly from the base 14 are a cylindrical boss 16 and an annular flange 18 concentric with the boss 16. The flange 18 is disposed between the inner and outer cylinders 10, 12 and it provides a seat for a pair of annular seals 20 and 22 which are in contact with, respectively, the inner wall of cylinder 12 and the outer wall of cylinder 10 to provide a fluid tight closure for the bottom of bore 13. The cylindrical boss 16 includes a circumferential recess 24 at its upper end which receives an annular seal structure 26 providing a fluid closure of the bottom of bore 15.

While any sealing means capable of sustaining very high pressure may be utilized for the sealing structure 26, the seal assembly disclosed in the application of Gerard et al., Ser. No. 127,738, filed July 28, 1961, now Patent No. 127,738 and assigned to the assignee of the present application is suitable in the hydrostatic device. Briefly, the seal structure disclosed in that application comprises an annular member 28 of having circumferential grooves 30 and 32 in diagonally opposite corners and sealing elements 34 and 36 disposed in the grooves 30 and 32. A plate 37 mounted on the face of the cylindrical boss 16 is arranged to preload the seal structure 26. Reference may be had to the Gerard et al. application referred to above for a more complete description of the seal assembly and of its operation.

Pressures are created in the chambers of the inner cylinder 10 and the outer cylinder 12 by a single ram 38, which includes a piston 40 arranged to extend downwardly into the bore of the inner cylinder 10. A seal structure 42, which may be the same as seal 26, is disposed on the lower end of the piston 40 to provide a fluid tight closure of bore 15 at the top end thereof. The upper end of the outer cylinder 12 includes an inturned flange 44, which defines a central opening 46. The opening 46 receives a second piston 48 on the ram 38, and a seal 50 is disposed between the piston 48 and the wall of the opening. The ram 38 is preferably the driven piston of another hydrostatic device, but it may, of course, be driven by any suitable means.

In operation a force F in the direction of the arrow on the upper face (not shown) of the ram 38 drives the ram 38 downwardly creating hydrostatic pressure in a hydrostatic medium in each of the cylinders 10 and 12 due to the displacement of the faces of the pistons 40 and 48.

The change in pressure ($\Delta P$) in each vessel can be expressed by the following equation:

$$\Delta P = B(-\Delta V/V_0) = BU$$

where

B is the bulk modulus of the hydrostatic medium in the vessel,
$\Delta V$ is the change in the volume due to a displacement (D) of the piston face, and
$V_0$ is the initial volume in the vessel,
U is $(-\Delta V/V_0)$ and is the average change in volume per unit volume caused in the medium by the displacement D.

The above equation does not account for the compression of the pistons or the deflection of the walls of the vessel. However, these two factors are generally inconsequential. For example, the bulk modulus of water and the modulus of elasticity of steel are related by factor of appropriately one thousand, and therefore, the unit displacement of a steel piston and the unit deflection of a steel cylinder is on the order of $1/10000$ of the unit change in volume ($\Delta V$) of water as the hydrostatic medium in the vessel.

The change in volume ($\Delta V$) in each vessel can be expressed by the following equation:

$$\Delta V = DA$$

where

D is the displacement of the piston face and
A is the area of the piston face.

Accordingly, $$\Delta P = B(-DA/V_0)$$

Inasmuch as both piston faces move downwardly a substantially equal distance in both the inner and outer vessels, the ratio between the pressures in the vessels, obtained by dividing the equations for each vessel, is substantially as follows:

$$\frac{\Delta P_1}{\Delta P_2} = \frac{B_1 A_1 V_2}{B_2 A_2 V_1}$$

where the numbers 1 and 2 for each element of the equation identify that element for the vessel in the inner cylinder 10 and the vessel in the outer cylinder 12, respectively.

Therefore, it will be observed that either varying the relationship between the areas and volumes of each of the vessels or providing hydrostatic media having different bulk moduli in the vessels readily enables the creation of a substantially higher pressure in the inner vessel than that in the outer vessel.

Hydrostatic pressure on the outer walls of the inner cylinder 10 produced by compressing the hydrostatic medium in the outer vessel creates, in effect, a pre-stress in compression in the inner zone of the cylinder in the circumferential direction which partially offsets the tensile stress created by the pressure in the inner vessel. Accordingly, the range of tensile stress which the cylinder 10 may safely endure is increased to the extent of the prestress and therefore, a hydrostatic pressure device, in accordance with the invention, is capable of containing higher pressures than would otherwise be possible.

While the inner cylinder 10 may be a single wall element, it may also be a multi-wall element, as shown in the drawing which illustrates three concentric shrink-fitted cylinders 10*a*, 10*b* and 10*c*, thereby providing a combination of pre-stressing in the inner zone thereof due both to this manner of constructing the cylinder and to the pressure in the outer vessel.

As previously mentioned, the hydrostatic medium in each of the inner and outer vessels may be the same substance or different substances, and additionally, may be, at ordinary temperatures and pressures, either a liquid or a solid, the solid being of a type which behaves hydrostatically at elevated pressures and/or temperatures (the latter being applicable where the hydrostatic pressure device is operated with elevated temperatures in the inner vessel).

A multiplication of the effect obtained by a single outer vessel may be accomplished by including one or more additional vessel arranged successively outwardly around the outer cylinder 12. In this case, the pressures in each of the inner vessels is offset by the pressure in the adjacent outer vessel so that a pre-stress is created in the inner zone of each of the vessels, except for the outermost vessel.

It will be understood that the above described embodiment is merely exemplary and that it is susceptible to considerable variation and modification by those skilled in the art without departing from the spirit and scope of the invention. All such modifications and variations are intended to be within the scope of the appended claims.

I claim:

1. A hydrostatic pressure device comprising a base plate having a cylindrical boss extending upwardly therefrom, a first cylinder having a bore completely therethrough disposed about said cylindrical boss and supported on said base plate, sealing means between the bore of said first cylinder and said cylindrical boss and defining a first chamber having an opening at the upper end thereof, a second cylinder supported on said base and having a bore therein, the wall of said second cylinder bore spaced from and surrounding the outer wall of said first cylinder, sealing means arranged between the lower ends of said first cylinder and said second cylinder and defining in the bore of said second cylinder a second chamber having an opening at the upper end thereof, said second chamber surrounding said first chamber and being at least axially coextensive with said first chamber, a hydrostatic medium in each of said first and second chambers, a ram having a first downwardly extending piston disposed within the opening of said first chamber, and a second downwardly extending piston disposed in the opening of said second chamber, sealing means between said first downwardly extending piston and the opening of said first chamber, and sealing means between said second downwardly extending piston and the opening of said second chamber, said first and second pistons on the ram being movable conjointly into the respective chambers to create hydrostatic pressure in the media therein.

2. A hydrostatic pressure device as claimed in claim 1, wherein the said first cylinder comprises a plurality of concentrically arranged elements which are press-fitted together so as to create a prestressed condition in compression in the zone of said cylinder adjacent said bore.

3. A hydrostatic prssure device as claimed in claim 1, wherein the quantity obtained when the volume of said first chamber is divided by the area of the face of said first piston is substantially less than the quantity obtained when the volume of said second chamber is divided by the area of said second piston face, the hydrostatic pressure created within the said first chamber thereby being substantially greater than hydrostatic pressure produced in said second chamber when the pistons are moved downwardly into the chambers.

4. A hydrostatic pressure device as claimed in claim 1, wherein the bulk modulus of the hydrostatic medium in said first chamber is substantially higher than the bulk modulus of the hydrostatic medium in said second chamber, the hydrostatic pressure created within said first chamber thereby being substantially greater than the hydrostatic pressure created within said second chamber when the pistons are moved into the chambers.

5. A hydrostatic pressure device as claimed in claim 1, wherein said first and second chambers contain first and second volumes, respectively, the hydrostatic medium in said first chamber has a bulk modulus of elasticity designated as $B_1$, and the hydrostatic medium in said second chamber as a bulk modulus of elasticity designated as $B_2$, said first and second piston faces have areas such that when said pistons are moved into said chambers, compressive changes in volume per unit, volume $U_1$ and $U_2$ are created in, respectively, said first and second volumes, and the quantities $B_1$ and $B_2$ and $U_1$ and $U_2$ have respective values proportioned to each other rendering the quantity $B_1U_1$ greater than the quantity $B_2U_2$.

6. Hydrostatic pressure apparatus comprising, pressure vessel means having an inner chamber and at least one outer chamber circumferentially surrounding said inner chamber and separated therefrom by wall means, said inner and outer chambers containing first and second volumes, respectively, of hydrostatic medium with a bulk modulus of elasticity designated as $B_1$ and $B_2$ for the inner and outer chambers, and ram means closing both chambers and drivable into each to produce compressive changes of volume per unit volume $U_1$ and $U_2$ in, respectively, said first and second volumes, said quantities $U_1$ and $U_2$ having respective values proportioned to each other to render the quantity $B_1U_1$ greater than the quantity $B_2U_2$.

7. A hydrostatic pressure device, comprising means defining a plurality of separate chambers arranged successively outward of each other, each of said chambers having walls, a closed end and an open end, the walls of each chamber being spaced apart and arranged to surround the walls of those chambers lying inwardly thereof, and each chamber being at least axially coextensive with those chambers lying inwardly thereof, a hydrostatic medium in each chamber, and a ram having a plurality of pistons, one of said pistons disposed within the opening of each of said chambers and the pistons on the ram being axially movable conjointly into the respective chambers to create hydrostatic pressure in the medium therein.

8. A hydrostatic pressure device, comprising means defining a first chamber having side walls, a closure at one end and an opening at the other end of said wall, means defining at least one second chamber arranged to surround the walls in said first chamber, said second chamber having side walls disposed outwardly of the side walls of said first chamber, a closed end adjacent the closed end of said first chamber and an opening adjacent the opening of said first chamber, and said second chamber being at least axially coextensive with said first chamber, a hydrostatic medium in each of said first and second chambers, and a ram having a plurality of pistons, one of said pistons disposed in the opening in said first chamber and the other of said pistons disposed within the opening of said at least one second chamber, and the pistons on the ram being movable conjointly into the respective chambers to create hydrostatic pressure in the media therein.

9. A hydrostatic pressure device as claimed in claim 8, wherein the bulk modulus of the hydrostatic medium in said first chamber is substantially higher than the bulk modulus of the hydrostatic medium in said second chamber, the hydrostatic pressure created within said first chamber thereby being substantially greater than the hydrostatic pressure created in said second chamber when the pistons are moved into the chambers.

10. A hydrostatic pressure device as claimed in claim 8, wherein the relationship between the area of the piston face in the opening of said first chamber and the volume of said first chamber, and the area of the piston face in the opening in said second chamber and the volume of the second chamber is such that the hydrostatic pressure created in the hydrostatic medium in said first chamber is substantially greater than the hydrostatic pressure created in the hydrostatic medium in said second chamber.

References Cited by the Examiner

UNITED STATES PATENTS

| | | | |
|---|---|---|---|
| 814,972 | 1/1907 | Huber | 100—269 |
| 3,123,862 | 3/1964 | Levey. | |

WILLIAM J. STEPHENSON, *Primary Examiner.*

UNITED STATES PATENT OFFICE
CERTIFICATE OF CORRECTION

Patent No. 3,224,042 December 21, 1965

Milton Meissner

It is hereby certified that error appears in the above numbered patent requiring correction and that the said Letters Patent should read as corrected below.

Column 1, line 27, for "proir" read -- prior --; column 2, line 50, for "127,738" read -- 3,156,475 --; column 3, line 28, for "appropriately" read -- approximately --; line 30, for "1/10000" read -- 1/1000 --; column 6, line 41, for "814,972" read -- 841,972 --.

Signed and sealed this 23rd day of August 1966.

(SEAL)
Attest:

ERNEST W. SWIDER
Attesting Officer

EDWARD J. BRENNER
Commissioner of Patents